Patented Nov. 25, 1947

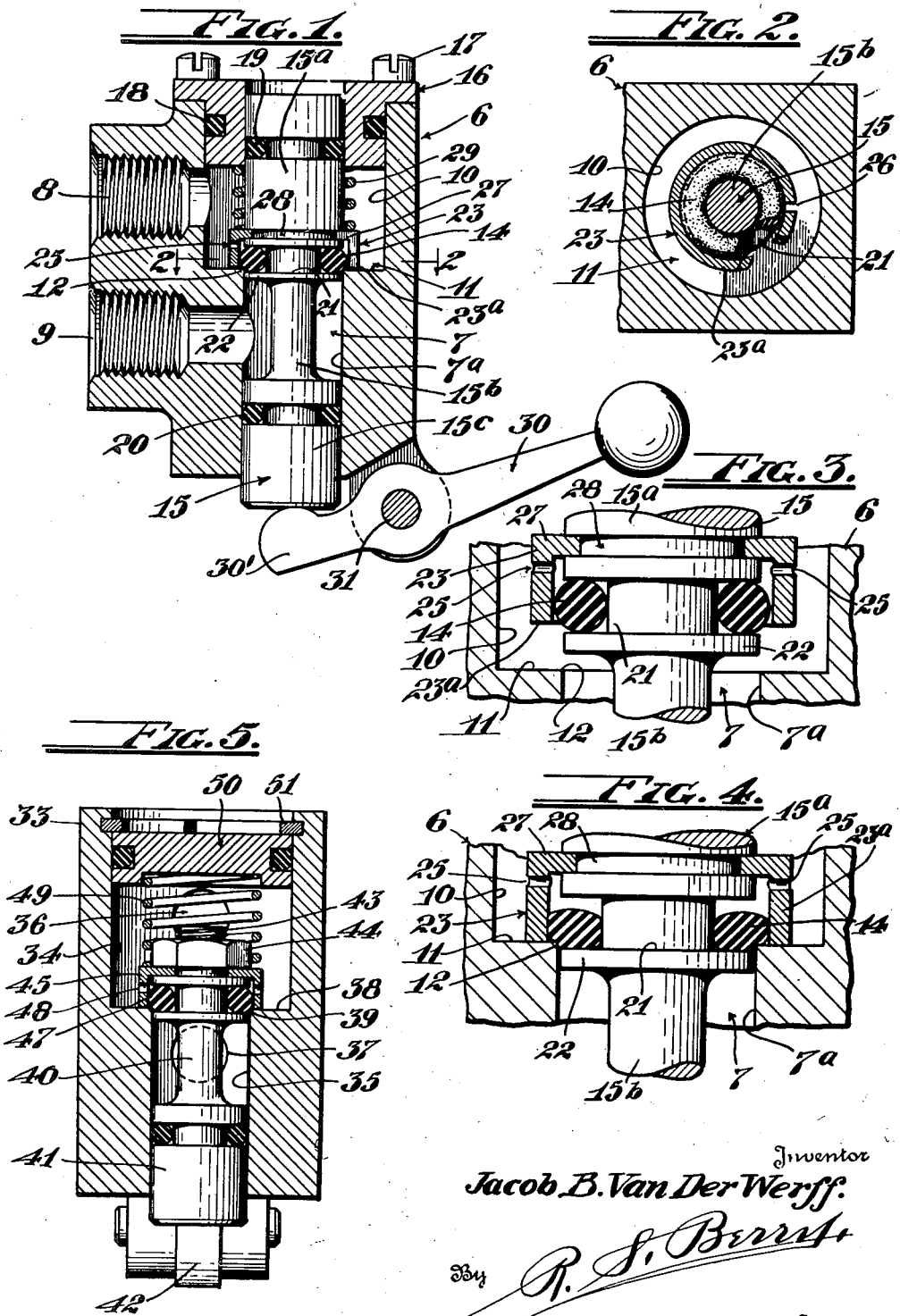

2,431,437

UNITED STATES PATENT OFFICE 2,431,437

VALVE

Jacob B. Van Der Werff, Pasadena, Calif., assignor to Adel Precision Products Corp., a corporation of California Application May 1, 1944, Serial No. 533,589

4 Claims. (Cl. 251—27)

This invention concerns hydraulic valves, particularly those for use in aircraft hydraulic actuator systems operating under high pressures.

An object of the invention is to provide a valve of the character described in which a resilient self-sealing valve member is constructed and arranged to assure a reliable leak-proof valve action regardless of wear, eccentricity and misalignment factors which usually render high pressure valves unfit for use.

Another object of the invention is to provide compressible elastic valve member and associated elements of such construction and arrangement as will provide a small, compact valve unit of simple construction subject to economical manufacture.

Still another object of the invention is to provide a valve of few parts which are so constructed and arranged as not to require the fine surface finishes and close tolerances which heretofore have been prerequisites of valves for high pressure hydraulic systems.

A still further object of the invention is to so arrange the operated element of the valve as to adapt it for actuation by any of the means usually employed as, for example, an eccentric, a cam, a solenoid, a hand lever, a hydraulic piston, etc., as may be desired for individual installations.

Still another object is to provide a valve of the character described which is operable with a small handle load although opened against a high pressure.

With the foregoing objects in view, together with such other objects and advantages as may subsequently appear, the invention is carried into effect as illustrated by way of example in the accompanying drawings, in which:

Fig. 1 is a vertical sectional view of a valve embodying this invention;

Fig. 2 is a cross sectional view taken on the line 2—2 of Fig. 1;

Fig. 3 is an enlarged fragmentary view showing the valve unseated;

Fig. 4 is a fragmentary sectional view similar to Fig. 4 showing the valve seated;

Fig. 5 is a vertical sectional view of a modified form of the invention.

One embodiment of my invention as shown in Figs. 1 to 4 of the accompanying drawing includes a valve body member 6 having a bore 7 extending therethrough and provided with inlet and outlet ports 8 and 9. The inlet port 8 opens into a diametrical enlargement of said bore forming a valve chamber 10 occupying substantially the upper half of the bore, whereas the outlet port 9 opens in the lower "half" or portion 7a of the bore which lower "half" is in the present instance of substantially uniform diameter.

The formation of the enlargement or chamber portion 10 of the bore provides an annular shoulder 11 the inner edge 12 of which serves as an annular valve seat and defines the "valve opening" between the chamber 10 and the lower portion 7a of the bore 7.

In accordance with my invention an annular valve member or valve ring 14 formed of yieldable, deformable and preferably elastic material such as rubber or synthetic rubber, together with a reciprocable stem or operating member 15 therefor constitute a poppet valve operable in the chamber 10 and the remainder of the bore, to seat and unseat the valve ring 14.

The stem 15 is provided with an upper or outer portion 15a substantially equal in diameter to that of the "valve opening" defined in the bore 7 by the annular valve seat or edge 12, an intermediate reduced portion 15b, and a lower or inner portion 15c corresponding in diameter to the portion 15a. The outer part of the portion 15a has a working fit in the bore of a flanged annular closure member 16 fitted in the outer end of the diametrically enlarged portion 10 of the bore 7 and secured to the body 6 by means of suitable fastenings 17. A seal is provided between the member 16 and wall of the chamber 10 by means of a sealing ring 18 whereas a seal is provided between the portion 15a of the stem and the wall of the bore of the annular member 16 by means of a sealing ring 19. Portion 15c has a working fit in the lower lid or bore 7 and carries a similar sealing ring 20.

As here provided the annular yieldable valve member or valve ring 14 surrounds the portion 15a of the stem 15 so as to be movable therewith in the chamber 10 to seat and unseat member 14 relative to the edge seat 12 of shoulder 11. Preferably the valve ring 14 is of circular cross section and mounted in a groove 21 therefor formed in the portion 15a of the stem 15. This groove has a depth (radial dimension) less than the thickness of the valve ring 14 so that the outer peripheral portion of the ring will protrude circumferentially outward from the stem portion 15a. In other words, the over-all diameter of the valve ring 14 is greater than the diameter of the valve opening defined by the edge seat 12, or the diameter of the stem portion 15a. The width (axial dimension) of the groove 21 is such that the valve ring will normally seat therein in contact with the three walls of the groove but without being appreciably distorted from its normal circular cross section as best shown in Fig. 3.

As shown in Fig. 4 the inner end 22 of the stem portion 15a has a working fit in the bore portion 7a and lies in said bore portion when the valve ring 14 is seated, but is moved out of said bore portion into the chamber 10 when the valve is unseated as shown in Fig. 3. Due to the proximity of the groove 21 to the end 22 said end takes the form of a thin annular disk.

A means is provided for retaining the valve ring 14 in place in the groove 21 and limiting the seating movement of the stem 15 to a position in which the desired seating action of the valve ring 14 on the edge seat 12 therefor takes place. As here shown this means comprises a stem-carried cylindrical sleeve or stop member 23 surrounding and fixed to the stem portion 15a. This sleeve also surrounds the outer peripheral portion of the valve ring 14 with the inner surface of its cylindrical wall either closely spaced from or lightly contacting the outer peripheral portion of the valve ring, and its inner end 23a terminated in a plane spaced somewhat axially outwardly from the plane of the inner transverse wall of the groove 21. This arrangement of the sleeve 23 provides an annular space between the sleeve and the end portion 22 of stem portion 15a, which space though of less width than the thickness of the valve ring and therefore holding the ring against dislodgement from the groove 21, readily affords the seating of the ring against the edge seat 12 in the manner clearly shown in Fig. 4. In this connection it should be noted that when the ring valve is seated, the inner end 23a of the sleeve 23 abuts the shoulder 11 to limit the seating movement of the valve to the extent indicated in Figs. 1 and 4. The circumferential spacing of the sleeve 23 from the stem portion it surrounds causes the end 23a to engage the shoulder 11 at points outwardly spaced from the edge seat 12 whereby the valve ring 14 will overlie the shoulder beyond the edge seat 12 as shown in Fig. 4.

To insure the application of the pressure of the fluid in chamber 10 to the deformable valve ring 14 the sleeve is provided with openings 25 whereby this pressure is effective to compress and flatten out ring 14 as shown in Fig. 4 once the ring is seated against the edge seat 12. When thus deformed the ring is forcibly pressed against the inner transversely extending wall of the groove 21, the edge seat 12, the annular shoulder surface contiguous to said edge and the inner surface of the sleeve 23 as well as the "bottom" (axially extending) wall of the groove 21, thereby providing an effective leak-proof seal on three major surfaces besides the edge 12. Upon unseating the valve ring, the pressure is equalized thereon and the ring assumes its normal circular cross section as shown in Fig. 3.

Any suitable means may be employed to fix the sleeve or stop member 23 to the stem. As here shown the sleeve is axially split as at 26 and is resilient and provided with an inwardly extending flange 27 at its outer end adapted to be snapped into a groove 28 therefor in the stem portion 15a whereby the sleeve is held in place on the stem.

The valve ring 14 is urged against its seat by means of a spring 29 surrounding the stem portion 15a. One end of this spring abuts the inner end of the annular closure member 16 and the other end rests against the flanged end of the sleeve 23.

It should be noted that the valve stem 15 hereof is substantially hydraulically balanced due to the diameter of the stem portion 15a exposed in the chamber 10 being substantially equal to the diameter of the valve seat 12. Therefore while the pressure of the fluid in chamber 10 is substantially ineffective to urge the stem member 15 in either direction, it is effective against the deformable valve ring 14 to compress it into a leakproof seating contact with the seat 12, certain walls of the groove 21, the shoulder 11 and the inner surface of the cylindrical wall of the sleeve 23 as best shown in Fig. 4. This counter balancing of the stem 15 makes for a small handle load in unseating the valve even though the valve member 14 itself is pressure seated by the high pressure in the chamber 10, it only being necessary to overcome the relatively small spring load on the stem to unseat valve 14.

Any suitable means such as the lever 30 may be employed to unseat the valve 14, said lever being pivoted on the body 6 as at 31 and having its end 30' in engagement with the protruding end of the stem portion 15c as shown in Fig. 1.

Fig. 5 shows a modified form of my invention in which the valve body 33 has a bore therethrough providing an enlarged chamber portion 34 and a smaller bore portion 35 corresponding to chamber 10 and bore portion 7 respectively in Figs. 1 to 4. Inlet and outlet ports 36 and 37 open into the chamber 10 and bore portion 35 in the same manner as shown in Fig. 1.

The bore enlargement or chamber 34 defines a shoulder 38 and a seating edge 39 corresponding to shoulder 11 and seat 12 in Figs. 1 to 4.

A valve stem or operating member 40 is reciprocable in chamber 34 and bore 35 and includes a lower piston-like portion 41 contacting with an operating lever 42 in the same manner as shown in Fig. 1. The upper end of the stem 40 is reduced and screwthreaded as at 43 and a nut 44 is turned thereon to hold a flanged sleeve 45 similar to sleeve 23 on the stem so that the inner end of said sleeve serves as a stop against the shoulder 38 in the same manner as sleeve 23. The stem 40 next adjacent the end 43 is constructed to provide a groove, corresponding to groove 21, for reception of an annular, deformable and elastic valve ring 47 identical with ring 14 and arranged in the same manner relative its associated stem and sleeve, for seating and sealing contact with edge seat 39 and adjacent surfaces of shoulder 38 and walls of groove and sleeve 45. Pressure is effective against the valve ring 47 through openings 48 in the sleeve 45, in the same manner as shown in Fig. 4. A spring 49 is interposed between the sleeve 45 and a closure 50 in chamber 34, to seat the valve member 47. The closure 50 is held in place by means of a snap ring 51.

The valve member 47 in this form of my invention is seated and unseated in the same manner as the valve member 14 shown in Figs. 1 to 4, except that the stem 40 is not counter balanced and the sleeve 45 need not be split as it may be slipped over the end 43 of the stem and held in place by the nut 44.

Heretofore efforts have been made to form inclined face poppet-type valves with resilient sealing rings seated in grooves in the valve or valve seat faces, but the effect of high pressure fluids on such constructions has never been satisfactory in that the flow of fluid when the valve was opened tended either to dislodge the ring completely or to abrade the face of the ring. Still other efforts have been made to provide poppet valves of softer material than the valve seat, such as plastic material, and to allow the pressures to which the valve are subjected to form a seat in the valve. However, continued use tended to build up a seating area to such an extent that the valve was no longer effective or else the pressure induced fracture in the seating area permitted the dislodgement of particles of the valve material with consequent contamination of the fluid. Prior to the present invention the most satisfactory valve construction has been the fitting of an extremely accurately machined hardened steel valve and seat which is both difficult and costly to manufacture since the tolerances must be of the order of .001" and the surface finish of the order of 3–5 microns.

By use of my improved self-sealing valve, however, the tolerances need not be held to less than plus or minus .001 and on many parts they may be even greater. Consequently the valve may be produced by less skilled operators than have been required heretofore and further manufacturing economies may be realized through the use of automatic machinery which in many instances could not be used for the hardened steel seat type of poppet valve now generally in use. Still further it will be realized that my valve is capable of ready disassembly for purposes of inspection or replacement of parts without the need for special tools.

While I have shown and described specific embodiments of my invention I do not limit myself to the exact details of construction set forth, and the invention embraces such changes, modifications and equivalents of the parts and their formation and arrangement as come within the purview of the appended claims.

I claim:

1. In a valve, a valve body member having a bore therein, inlet and outlet ports leading from said bore, an annular valve seat in said bore between said ports, and a shoulder contiguous with said seat; a valve operating stem reciprocable in said bore and having a groove therein substantially rectangular in cross section, an annular valve member of compressible elastic material mounted in said groove and movable with the stem so as to be seated and unseated, said annular valve member normally being substantially circular in cross section, and a stop member supported on said stem and surrounding said valve member so that a peripheral portion of the valve member is exposed between said stop member and said stem for contact with said valve seat, said stop member having openings to admit fluid pressure to said valve member and being disposed so that the shoulder-contacting portion thereof is spaced axially outwardly from the plane of the side wall of the groove which side wall is nearer to the annular valve seat, and will contact said shoulder to limit the movement of said stem to a position in which the valve member is compressed against said seat and disposed in part beyond said shoulder, said valve member when seated being exposed to the pressure of the fluid in said bore and compressed thereby against said seat into a flattened shape as viewed in cross section.

2. In a valve, a valve body having a bore, inlet and outlet ports opening into said bore, and an annular valve seat in said bore between said ports, said bore being reduced between the seat and the outlet port, a valve stem reciprocable in said bore, an annular yieldable and elastic valve member carried by and surrounding said stem, a portion on said stem adapted to extend into and close the reduced part of the bore, an annular portion on said valve member extended outwardly from the stem with an edge thereof spaced axially away from the plane of the portion of the valve member nearest to said seat for contact with said seat so that the valve member will be compressed against the seat when said valve portion on said stem closes said reduced part of said bore, means on the stem providing for a hydraulic balancing thereof so that the fluid pressure is ineffective to move the stem itself in either direction although the valve member when seated is subject to deformation and compression against said seat by means of the pressure of the fluid in the bore, and means for moving the stem to seat and unseat said valve member.

3. In a valve, a valve body member having a bore, an annular closure member in an end portion of said bore, inlet and outlet ports opening into said bore, an annular stop shoulder in said bore between said ports with its inner peripheral edge constituting an annular valve seating edge, said bore being reduced between said seating edge and said outlet port, a valve operating stem reciprocable in said bore, a valve portion on said stem adapted to be moved into and out of position closing said reduced portion of said bore, an annular valve member of yieldable elastic rubber-like material carried by and surrounding said stem, said valve portion being arranged so that it will close the reduced portion of the bore before the valve member is seated on said edge of said shoulder, and a stop member on said stem for engaging said shoulder to limit the movement of the stem to a position in which said valve member is compressed against said edge and seated thereon, said stop member having its shoulder-engaging edge spaced axially outwardly from the plane of that part of the valve member which is nearer to the plane of said shoulder whereby the valve member will contact said seating edge before said stop member contacts said shoulder.

4. In a valve, a body member having a bore therein and an inlet port and an outlet port opening into said bore, an annular shoulder in said bore between said ports, the portion of the bore between said shoulder and said outlet port being reduced, a reciprocable valve member in said bore having a valve portion movable into and out of said reduced portion of said bore to close and open the bore between the shoulder and the outlet port, said valve member having a groove in a part thereof which is contiguous to said valve portion so that said groove is disposed in part within the reduced portion of said bore when said valve portion is in bore-closing position, spring means normally holding said reciprocable valve member in bore-closing position, an annular compressible and elastic valve member carried in said groove and arranged to seat against said shoulder, and a stop member carried by said reciprocable valve member and surrounding said annular valve member with its shoulder-engaging edge spaced axially away from the plane of the side wall of the groove which side wall is nearer to the plane of said shoulder whereby said valve portion will close the bore before the annular valve member contacts said shoulder and will be compressed against said shoulder before the said shoulder-contacting edge abuts said shoulder.

JACOB D. VAN DER WERFF.

REFERENCES CITED

The following references are of record in the file of this patent:

UNITED STATES PATENTS

| Number | Name | Date |
|---|---|---|
| Re. 7,048 | Frink | Apr. 11, 1876 |
| 820,239 | Moss | May 8, 1906 |
| 1,156,196 | Von Philip | Oct. 19, 1915 |
| 1,687,745 | Wilson | Oct. 6, 1928 |
| 1,716,896 | Miller | June 11, 1929 |
| 1,844,159 | Hamer | Feb. 9, 1932 |
| 1,861,916 | Hennebohle | June 7, 1932 |
| 2,180,795 | Christensen | Nov. 21, 1939 |
| 2,314,683 | Berry | Mar. 23, 1943 |
| 2,358,228 | Hoof | Sept. 12, 1944 |